INVENTORS
AUGUSTUS HASBROUCK
REX A. HORROCKS
BY Charles A Warren
ATTORNEY

INVENTORS
AUGUSTUS HASBROUCK
REX A. HORROCKS

BY Charles Allassen
ATTORNEY

United States Patent Office 3,177,661
Patented Apr. 13, 1965

3,177,661
REGENERATIVE ENGINE WITH ROTATING MATRIX
Augustus Hasbrouck, Middletown, and Rex A. Horrocks, Marlborough, Conn., assignors to United Aircraft Corporation, East Hartford, Conn., a corporation of Delaware
Filed Oct. 9, 1962, Ser. No. 229,369
14 Claims. (Cl. 60—39.51)

This invention relates to a regenerator construction and particularly to the installation of the regenerator in co-operation with a gas turbine engine.

One feature of the invention is a rotary regenerator using a simple type of seal between the ends of the ducts through which the gases enter and leave the rotating regenerator element. This seal is readily replaced when necessary and is a simple ring seal in construction. Another feature is a regenerator, the surface of which is a portion of a sphere with cylindrical ducting directing gas to or from the regenerator. In this way, the intersection of the regenerator with the cylindrical duct through which the gas flows to or away from the regenerator is a circle so that a simple ring seal can be used at this point.

One feature of the invention is an arrangement of a regenerator with a gas turbine such that the ducting for the high pressure gas from the compressor is enclosed within the lower pressure ducting for the exhaust gas from the turbine thereby to reduce the pressure drop across the high pressure seal.

Other features and advantages will be apparent from the specification and claims, and from the accompanying drawings which illustrate an embodiment of the invention.

Figure 1:
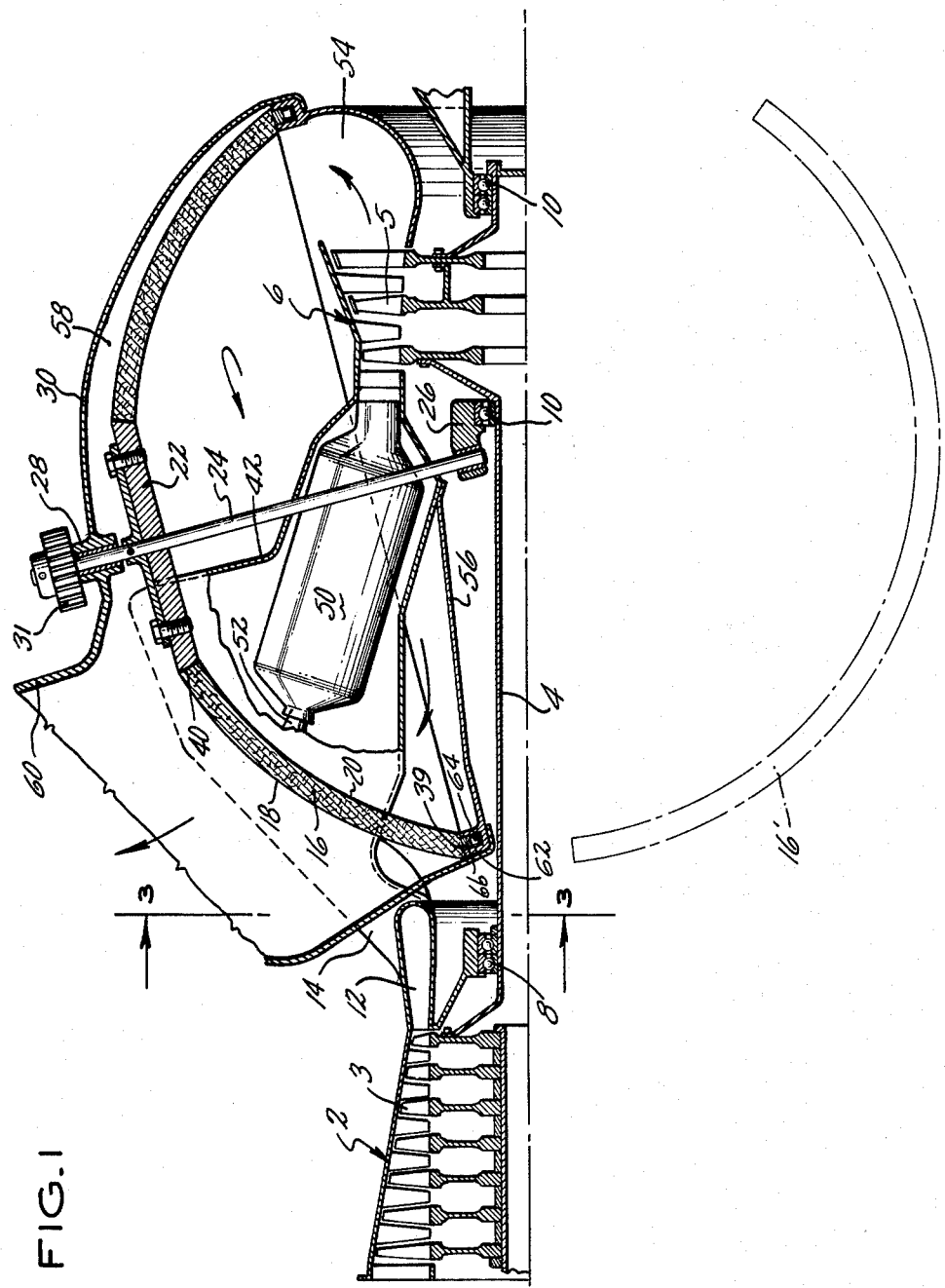
FIG. 1 is a longitudinal sectional view through a gas turbine engine with the regenerator associated therewith.

The arrangement is shown in conjunction with a gas turbine engine having an axial flow compressor 2 including a rotor 3 connected by a hollow shaft 4 to the rotor 5 of the turbine 6. Suitable bearings 8 and 10 support the compressor and turbine rotors. Air compressed by the compressor is delivered into an annular chamber 12 from which it is ducted by a plurality of duct elements 14 to pass through the matrix 16 of the regenerator. The latter is a segment of a hollow sphere having an outer spherical surface 18 and an inner spherical surface 20 both on the same axis such that the surfaces are parallel to each other.

In the arrangement shown, the regenerator element is less than a hemisphere and at the center of this regenerator element is a solid cap 22 which connects the regenerator element to a supporting shaft 24. The latter is journalled at its inner end in the bearing support 26 that supports one of the bearings 10 and is journalled at its outer end in a support 28 carried by a portion of the exhaust ducting 30. The shaft 24 is rotated by means of a gear 31 on the outer end of the shaft by a suitable driving means, not shown. The operative portion of the regenerator element is a porous heat-retaining element such as a plurality of tightly compressed layers of metallic screening which are brazed or otherwise permanently attached to form a unitary segment of a hollow sphere. In the arrangement shown, there is a second regenerator element 16' which corresponds to the element 16 and is similarly mounted in diametrically opposed relation to the element 16. Only one regenerator element and the associated parts are shown in detail.

Figure 2:
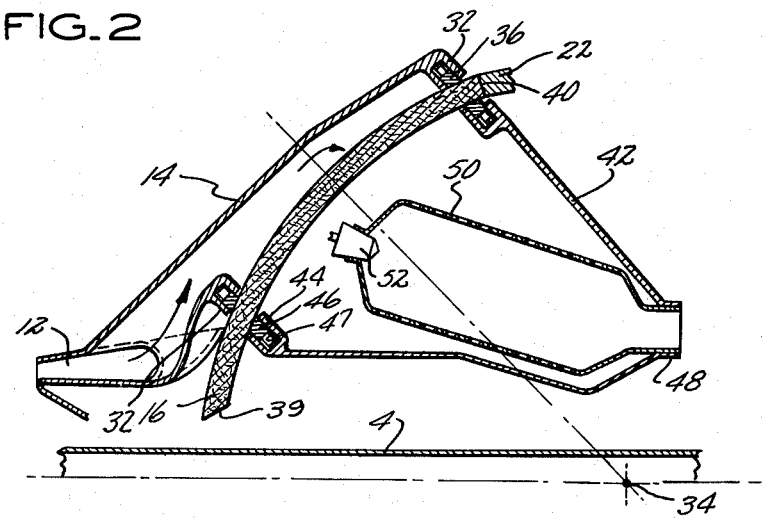
FIG. 2 is a sectional view through the high pressure ducting and a portion of the regenerator, the section being taken substantially along the line 2—2 of FIG. 3.
Figure 3:
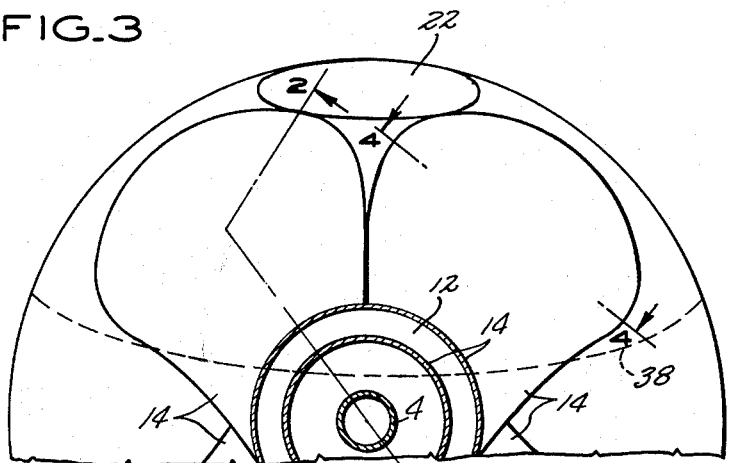
FIG. 3 is a transverse view of the regenerator and part of the inlet ducting for the regenerator taken substantially along the line 3—3 of FIG. 1 with the exhaust duct removed.
Figure 5:
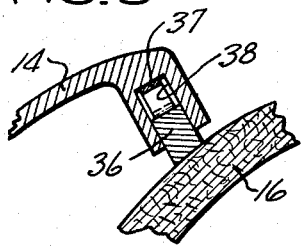
FIG. 5 is an enlarged sectional view of a detail showing the ducting from the compressor in detail.

Each duct 14 is bifurcated, as shown in FIG. 3, with each arm of the bifurcation terminating in a cylindrical portion 32, FIG. 2, where the duct engages with the regenerator element. Since the regenerator element is spherical, the intersection of the sphere with the cylindrical duct section 32, the axis of which intersects with the center 34 of the regenerator element, will be a circle and, accordingly, a circular seal 36 can be utilized to provide for sealing between the end of the duct and the regenerator element. This circular seal may be held resilient against the outer surface of the regenerator element by a wave spring 37, FIG. 5, in the base of the annular groove 38 in which the ring 36 is positioned.

Figure 4:
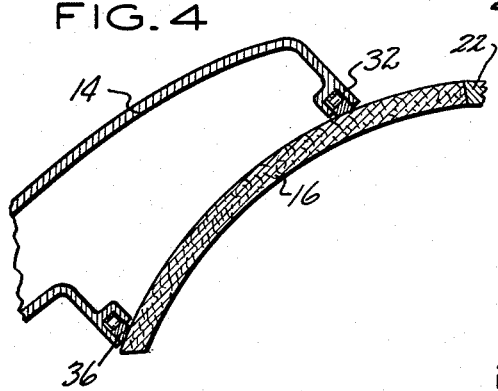
FIG. 4 is a fragmentary sectional view along the line 4—4 of FIG. 3.

It will be understood that the circular portion 32 of the duct actually extends from the outer periphery 39 of the regenerator element to the inner periphery 40 of the element in contact with the cap 22 as will be most apparent from the showing of FIG. 4. The section on which FIG. 2 is taken does not depict this condition at the outer periphery of the regenerator and in FIG. 1 the showing is misleading because of the fact that the duct element 14 is in back of the section along which the showing of FIG. 1 was taken.

The gas under pressure from the duct 14 passes through the regenerator element and into a combustion chamber duct 42 which has a cylindrical portion 44 adjacent to the inner surface of the regenerator element. This cylindrical portion receives a sealing ring 46 which is circular in the same manner that the seal ring 36 is circular and is guided in a cylindrical groove 47. The combustion chamber duct terminates in a segment-shaped outlet portion 48 for the discharge of this gas into the turbine inlet 6. There is a combustion chamber duct for each of the regenerator inlet ducts 14, so it is obvious that there are, in the arrangement shown, four combustion chamber ducts. Since each of the ducts 42 has a segment-shaped outlet, by making each outlet extend through an arc of 90° the four segments will form a complete annulus at the turbine inlet.

Each combustion chamber duct 42 therein has a flametube 50 with a fuel nozzle 52 at its upstream end. Combustion of fuel takes place within the flametube thereby heating the gas before it enters the turbine. The flametube may be of any of the usual perforated constructions for the admission of air from the combustion chamber duct into the flametube.

Referring now to FIG. 1, the turbine exhaust gas is received in an annular chamber 54 from which it is ducted into the inside of the regenerator elements by a baffle 56 which is so arranged as to contain gas flowing from the annular chamber 54 and direct it into the inside of the regenerator. It will be apparent that in this way the exhaust gas from the turbine surrounds the combustion chamber ducts, as best shown in FIG. 1.

The exhaust gas from the turbine passing outwardly through the porous regenerator element in the areas surrounding the several combustion chamber ducts is received in an outlet chamber 58 which surrounds the regenerator element in spaced relation thereto. The outer wall of this chamber is defined by the ducting 30 which has an opening 60 for the escape of the exhaust gas. This exhaust ducting engages at its periphery with the periphery of the regenerator element and receives gas passing through the regenerator element in the areas surrounding the ends of the duct elements 14.

To prevent leakage of the turbine exhaust gas, the baffle 56 has a cylindrical portion 62 adjacent to the outer edge of the regenerator element and this cylindrical portion has a circular groove 64 therein to receive a ring seal 66 held resiliently against the flat circular periphery of the regenerator. A wave washer, not shown, similar to that of FIG. 5, may be used for holding the ring against the regenerator element.

To prevent leakage of exhaust gas at the periphery of the exhaust duct 30, a seal may be provided, or, as shown, the periphery of duct 30 may be attached to the periphery of baffle 56. With this arrangement the effect of the seal is to prevent leakage from the space within the regenerator into the duct 30.

In operation, when the turbine engine is running, the compressor delivers air into the duct elements 14 where it is blown through the regenerator to enter the combustion chamber ducts 42. From these ducts the air enters the flametubes to mix with the fuel delivered by the nozzles 52. The fuel and air mixture burns in these tubes and provides hot gas which drives the turbine as it passes through. The turbine exhaust gas is discharged into the space within the regenerator in surrounding relation to the combustion chamber ducts and passes through the regenerator into the exhaust duct 30 and thence out the stack 60.

During this time the regenerator is rotated slowly on its axis to carry the matrix successively from the area where the exhaust gas passes through the matrix to heat it into the area where the compressed air passes through the matrix to be heated. Thus heat is removed from the turbine exhaust gas and given up to the air from the compressor before it reaches the combustion chamber. The rate of rotation of the regenerator matrix may be selected to assure optimum heating of the compressed air and thereby most effective operation of the regenerator.

It is to be understood that the invention is not limited to the specific embodiment herein illustrated and described, but may be used in other ways without departure from its spirit as defined by the following claims.

We claim:

1. In a regenerator, a rotatable porous matrix having inner and outer surfaces which are part spherical and which are concentric, said matrix being mounted for rotation on an axis including the center of the sphere about which the surfaces are concentric, and duct elements on opposite sides of the matrix for directing gas through the matrix, at least one of the duct elements being cylindrical where it engages the surface of the matrix to form a circular end surface at the matrix, and a circular seal carried by the circular end of the cylindrical element and axially slidable in the cylindrical element for engagement with the matrix.

2. A regenerator as in claim 1 in which cooperating duct elements are located in alignment on opposite sides of the matrix.

3. A regenerator as in claim 1 in which the matrix is mounted for rotation on an axis coinciding with the axis of the concentric surfaces of the matrix.

4. A regenerator as in claim 1 in which the axis of the cylindrical portion of said one of the ducting elements intersects the center of the sphere of which the matrix surfaces are a part.

5. A regenerator as in claim 3 in which the circular seal is urged against the surface of the matrix to close the clearance space between the end of the duct element and the matrix surface.

6. The combination with a gas turbine engine having a compressor, a burner receiving gas from the compressor, a turbine receiving hot gas from the burner, and an exhaust duct into which the gas from the turbine is discharged, of a regenerator having a matrix in the form of a portion of a hollow sphere, said regenerator being mounted for rotation on an axis coinciding with the axis of the sphere, a first duct from the compressor to one side of the matrix, said duct having a cylindrical portion at the surface of the matrix, a circular seal carried by the end of said duct for engagement with the matrix surface and another duct from the opposite matrix surface to the burner, said another duct having a cylindrical end surface at the matrix surface and in axial alignment with the cylindrical end of the first duct.

7. The combination as in claim 6 in which the cylindrical end of said another duct has a circular seal therein to engage with the matrix surface.

8. The combination as in claim 6 in which the turbine exhaust duct extends from the turbine to said opposite matrix surface in surrounding relation to said another duct.

9. The combination as in claim 8 in which the exhaust duct has a seal therein for engagement with the periphery of the matrix.

10. The combination as in claim 8 in which a discharge duct extends from said one matrix surface in surrounding relation to the matrix end of the first duct.

11. A regenerator including a rotary porous matrix in the form of a segment of a hollow sphere having an inner segmental surface and an outer segmental spherical surface, said surfaces being concentric to each other, and said matrix being rotatable about an axis including the center of the spherical surfaces, at least one inlet duct extending to one of said surfaces and having a cylindrical end at the matrix surface, a ring seal carried by the end of the duct for engagement with the matrix surface and a discharge duct extending from one of said surfaces in surrounding relation to said inlet duct.

12. A regenerator as in claim 11 in which said discharge duct is cylindrical adjacent to the matrix such that the opening at the matrix is circular and a ring seal carried by said circular opening for engagement with the matrix.

13. A regenerator as in claim 11 in which the porous matrix is rotated on the axis of the segmental spherical surfaces.

14. A regenerator as in claim 11 in which the cylindrical end of the inlet duct has its axis intersecting the center of the sphere of which the matrix outer surface is a part.

References Cited by the Examiner

UNITED STATES PATENTS

| 2,880,972 | 4/59 | Williams | 60—39.51 |
| 2,925,714 | 2/60 | Cook | 60—39.51 |
| 3,039,265 | 6/62 | Williams et al. | 60—39.51 |
| 3,093,009 | 6/63 | Collman et al. | 165—9 |

FOREIGN PATENTS

| 458,882 | 8/49 | Canada. | |

SAMUEL LEVINE, *Primary Examiner.*

ABRAM BLUM, *Examiner.*